March 16, 1965  F. L. PUTZRATH  3,174,051
MINIMUM SIGNAL DETECTING CIRCUIT
Filed May 19, 1961

INVENTOR.
FRANZ L. PUTZRATH
BY *Wade Keomt*
ATTORNEY
*James S. Shannon*
AGENT

United States Patent Office 3,174,051
Patented Mar. 16, 1965

3,174,051
MINIMUM SIGNAL DETECTING CIRCUIT
Franz L. Putzrath, Oaklyn, N.J., assignor to the United States of America as represented by the Secretary of the Air Force
Filed May 19, 1961, Ser. No. 111,413
3 Claims. (Cl. 307—88)

In pattern matching systems such as character recognizers, for example, it is necessary to compare the incoming message with the available store of standard patterns. In many applications this is accomplished in a serial mode so that an error signal is produced the instantaneous voltage of which is proportional to the degree of error between the unknown pattern and the stored pattern. It then becomes necessary to determine when the error signal reaches a minimum value. The purpose of this invention is to provide a circuit for determining when an error signal or, more generally, any complex voltage wave reaches a minimum value.

The manner in which the above purpose is accomplished will be explained in detail with reference to the accompanying drawing in which.

Figure 1:
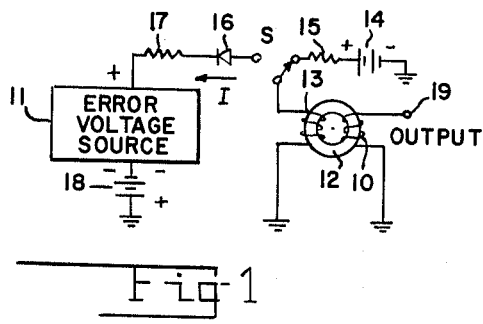
FIG. 1 is a schematic diagram of the minimum signal detecting circuit.

Referring to FIG. 1, the error voltage source 11 may be a pattern matching system as mentioned above which produces a unipolar error voltage the instantaneous value of which is proportional to the error between patterns to be matched. The circuit of FIG. 1 determines when the error voltage has its minimum value, i.e. when the closest match occurs. A typical error voltage variation as a function of time is shown in FIG. 2.

Figure 3:
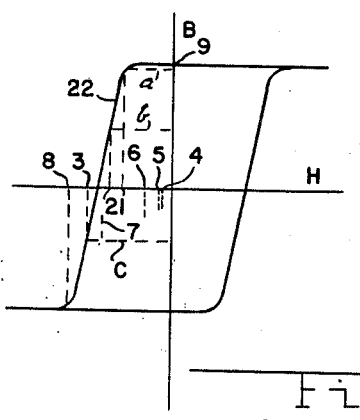

The circuit comprises a magnetic core 12 having a substantially rectangular hysteresis loop such as shown in FIG. 3. Wound on the core are a magnetizing winding 13 and an output winding 10. A single pole double throw switch S is provided which in its right hand position connects winding 13 in series with direct current source 14 and resistor 15 and in its left hand position connects winding 13 in a series circuit including unidirectional device 16, resistor 17, error voltage source 11 and direct current bias source 18. When switch S is in its right hand position source 14 provides sufficient current flow in coil 13 to saturate core 12 in one direction. When switch S is in its left hand position the difference between the error voltage and the voltage of source 18 determines the current flow in coil 13. Diode 16 permits this current flow to take place only in the direction in which it tends to reverse the initial magnetic polarity of the core, i.e. in the opposite direction to the current flow produced by source 14. Since source 18 is poled to send current through coil 13 in the magnetic polarity reversing direction and the error voltage is oppositely poled, it is apparent that such current flows only when the error voltage is less than the voltage of bias source 18. The voltage of source 18 should be such that when the error voltage is zero the magnetomotive force produced by coil 13 is just sufficient to completely reverse the initial saturation flux in core 12. A suitable magnetomotive force is illustrated by point 8 on the H-axis in FIG. 3, assuming the initial magnetic state of the core to be represented by point 9 on the hysteresis diagram. The magnitude of the error voltage should be such that its range of maxima lie below the voltage of source 18. The error voltage magnitude may be adjusted in the equipment supplying the error voltage by a conventional attenuator or amplifier as required.

Figure 2:
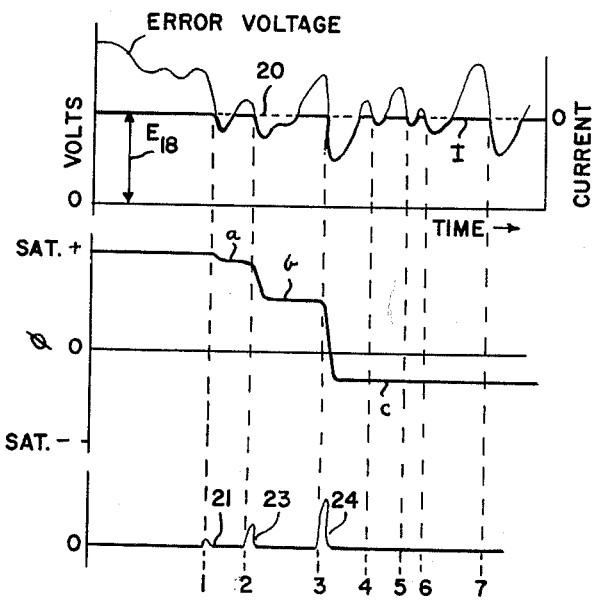
FIGS. 2 and 3 illustrate the operation of the circuit of FIG. 1.

The operation of the circuit in FIG. 1 is illustrated in FIGS. 2 and 3. Switch S is first thrown to the right to initially saturate core 12 in one direction and then to the left to determine when the error signal minimum occurs. As will be seen later, this minimum occurs when the last output pulse appears at output terminal 19.

In the upper diagram of FIG. 2 the dotted horizontal line 20 is placed along the vertical axis at a level equal to the voltage of source 18, designated $E_{18}$. When the error voltage is greater than $E_{18}$ no current flows in winding 13 because of diode 16. When the error voltage falls below $E_{18}$ a current I flows in winding 13 that is proportional to the difference between the error voltage and bias voltage $E_{18}$. Therefore, if line 20 is used as the zero current axis, the current I may be represented by the heavy line which lies on line 20 when the error voltage curve lies above line 20 and follows those portions of the error voltage curve falling below line 20.

At instant 1 the error voltage falls below the value of $E_{18}$ by a certain amount as seen in FIG. 2. The magnetomotive force produced by the resulting current flow in winding 13 is represented by the point on the H-axis in FIG. 3 and is only sufficient to reduce the flux in core 12 slightly to the level $a$. This change in flux induces a voltage pulse in the output winding which appears as pulse 21 at output terminal 19.

Because of the slope of portion 22 of the hysteresis loop it is apparent that no further reduction in core flux will occur until a magnetomotive force exceeding that represented by point 1 on the H-axis is produced. Since the magnetomotive force is proportional to the difference between the error voltage and the fixed bias voltage $E_{18}$, no further flux reduction will occur until the error signal falls below the low point that occurred at instant 1 in FIG. 2. In the example given, this occurs at instant 2, the resulting current pulse in winding 13 producing a magnetomotive force indicated by point 2 on the H-axis of FIG. 3 which reduces the core flux to level $b$. This flux change produces the voltage pulse 23 at output terminal 19.

The above process continues with each new low established by the error signal decreasing the core flux, or else causing the flux to reach zero and increase in the opposite direction, until the error signal minimum is reached. Since the greatest current flow in winding 13 occurs at the zero signal minimum, no subsequent current flow produced in this winding by the error voltage falling below $E_{18}$ can produce a magnetomotive force greater than that at the minimum. Therefore, no output pulses are produced after the minimum and consequently the last output pulse produced marks the time of occurrence of the minimum.

In the example given, the minimum occurs at instant 3 in FIG. 2 and is marked by output pulse 24. The magnetomotive force produced at the minimum, represented by point 3 on the H-axis in FIG. 3, caused the core flux to pass through zero and build up to level $c$ in the opposite direction. Subsequent current pulses in winding 13, produced by the error signal falling below $E_{18}$ at instances 4, 5, 6 and 7, produce magnetomotive forces indicated by points 4, 5, 6 and 7, respectively, on the H-axis of FIG. 3, all insufficient to change the flux from level $c$ and produce output pulses.

Although the error signal is shown as having positive polarity the circuit will operate in the same manner with a signal of negative polarity provided the polarities of sources 14 and 18 and the direction of diode 16 are reversed.

A particular advantage of the described circuit is that it can analyze an error signal over any period of time since core 12 can hold any of its remanent magnetic states indefinitely.

I claim:
1. A minimum signal voltage detecting circuit com- prising a magnetic core of the type having a substantially rectangular hysteresis loop, means for initially magnetizing said core to saturation in one direction, means for deriving a voltage equal to the difference between said signal voltage and a fixed voltage, means operative only when said signal voltage is less than said fixed voltage to apply a magnetomotive force to said core proportional to said difference voltage and in the initial magnetization reversing direction, and an output winding on said core for generating an output voltage pulse whenever the magnetic flux in said core changes.

2. A circuit for determining when a unipolar complex voltage wave provided by a signal source has its minimum value, said circuit comprising: a closed magnetic core of the type having a substantially rectangular hysteresis loop, a magnetizing winding and an output winding on said core, a source of direct current, a source of fixed bias voltage and a unidirectional device, means operative to first connect said magnetizing winding to said direct current source to magnetically saturate said core in one direction and then to connect said magnetizing winding in a series circuit including said unidirectional device, said bias voltage source and said signal source, said bias source and said unidirectional device being poled in opposition to said signal source in said series circuit, and said direct current source being poled to send current through said magnetizing winding in the opposite direction to the current flow when said winding is connected in said series circuit.

3. Apparatus as claimed in claim 2 in which said bias voltage is approximately equal to the voltage required to completely reverse the flux in said core when the voltage from said signal source is zero and in which the minimum value of said complex voltage wave is less than said bias voltage.

References Cited by the Examiner
UNITED STATES PATENTS 2,808,578   10/57   Goodell et al. _____ 340—174
3,041,583   6/62    Cray _____ 340—174

IRVING L. SRAGOW, *Primary Examiner.*